US012682554B2

(12) United States Patent
Da Veiga et al.

(10) Patent No.: US 12,682,554 B2
(45) Date of Patent: Jul. 14, 2026

(54) CONTEXT-BASED OBJECT VIEWING WITHIN 3D ENVIRONMENTS

(71) Applicant: Apple Inc., Cupertino, CA (US)

(72) Inventors: Alexandre Da Veiga, San Francisco, CA (US); Tobias Rick, Mountain View, CA (US); Timothy R. Pease, Emerald Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/244,355

(22) Filed: Sep. 11, 2023

(65) Prior Publication Data

US 2023/0419593 A1     Dec. 28, 2023

Related U.S. Application Data

(63) Continuation of application No. PCT/US2022/019411, filed on Mar. 9, 2022.
(Continued)

(51) Int. Cl.
*G06T 15/20* (2011.01)
*G06F 3/01* (2006.01)
(Continued)

(52) U.S. Cl.
CPC .............. *G06T 15/20* (2013.01); *G06F 3/013* (2013.01); *G06T 7/593* (2017.01); *G06T 19/006* (2013.01); *G06T 2200/24* (2013.01)

(58) Field of Classification Search
CPC ..... G06T 15/20; G06T 7/593; G06F 3/04815; H04N 13/361
See application file for complete search history.

(56) References Cited

U.S. PATENT DOCUMENTS 6,580,430 B1 * 6/2003 Hollis ................... G06T 15/005
345/473
2003/0090485 A1 * 5/2003 Snuffer ................. G06T 15/405
345/422
(Continued)

FOREIGN PATENT DOCUMENTS

CN          103443743 A     12/2013
EP           2107816 A2     10/2009
(Continued)

OTHER PUBLICATIONS

European Patent Office (ISA/EP), International Search Report and Written Opinion of the International Searching Authority, International Application No. PCT/US2022/019411, 13 pages, Jun. 22, 2022.
(Continued)

*Primary Examiner* — Bipin Gyawali
(74) *Attorney, Agent, or Firm* — Thompson Hine LLP

(57) ABSTRACT

Various implementations disclosed herein include devices, systems, and methods that present views of media objects using different viewing states determined based on context. In some implementations, a view of a 3D environment is presented. Then, a context associated with viewing one or more media objects within the 3D environment is determined, the media objects associated with data for providing an appearance of depth within the one or more media objects. Based on the context, a viewing state is determined for viewing a media object of the one or more media objects within the 3D environment, the viewing state defining whether the media object will be presented as a planar object or with depth within the media object. In accordance with a determination that the viewing state is a first viewing state, the media object is presented within the 3D environment (Continued)

using its associated data for providing the appearance of depth.

27 Claims, 7 Drawing Sheets

Related U.S. Application Data

(60) Provisional application No. 63/162,597, filed on Mar. 18, 2021.

(51) Int. Cl.
  G06T 7/593     (2017.01)
  G06T 19/00     (2011.01)

(56) References Cited

U.S. PATENT DOCUMENTS

| | | | | |
|---|---|---|---|---|
| 2012/0057778 | A1* | 3/2012 | Fukazawa | H04N 13/361 |
| | | | | 382/154 |
| 2012/0195460 | A1 | 8/2012 | Lawrence Ashok Inigo | |
| 2014/0055446 | A1 | 2/2014 | Corral-Soto | |
| 2018/0293041 | A1* | 10/2018 | Harviainen | H04N 13/361 |
| 2019/0121522 | A1* | 4/2019 | Davis | G06V 40/28 |
| 2019/0164334 | A1* | 5/2019 | Denman | G06T 15/205 |
| 2019/0212828 | A1* | 7/2019 | Kin | G06F 3/04815 |
| 2021/0042991 | A1* | 2/2021 | Wei | G06T 15/20 |
| 2021/0405851 | A1* | 12/2021 | Wu | G06F 3/04815 |
| 2023/0236674 | A1* | 7/2023 | Morikawa | G06F 3/038 |
| | | | | 345/157 |
| 2023/0305635 | A1* | 9/2023 | Han | G06F 3/04847 |

FOREIGN PATENT DOCUMENTS

| | | |
|---|---|---|
| EP | 2421270 A2 | 2/2012 |
| EP | 2426937 A1 | 3/2012 |
| WO | 2016055688 A1 | 4/2016 |

OTHER PUBLICATIONS

China National Intellectual Property Administration, First Office Action and Search Report issued in Chinese Patent Application No. 202280016057.3 dated Apr. 25, 2026 with English translation (24 pages).

* cited by examiner

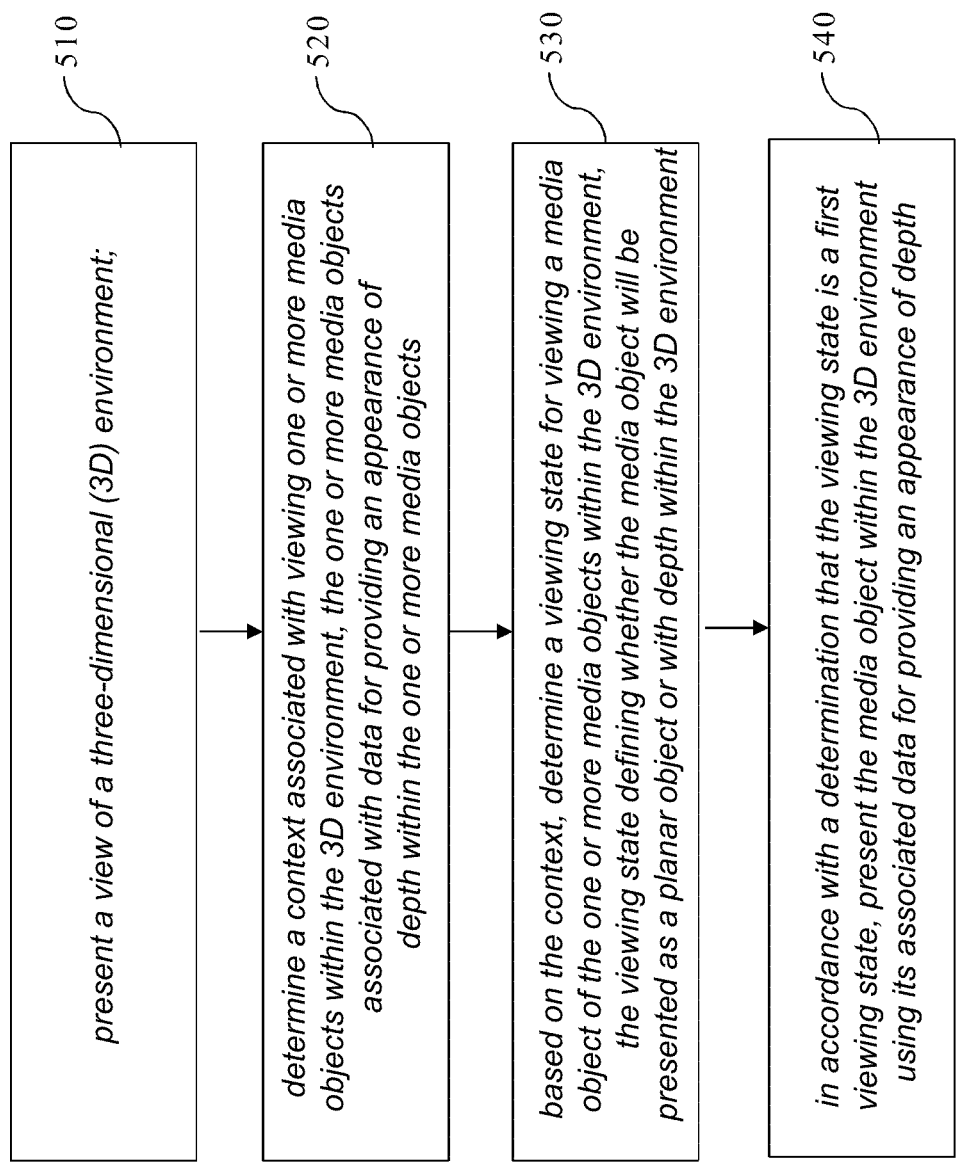

510 present a view of a three-dimensional (3D) environment;

520 determine a context associated with viewing one or more media objects within the 3D environment, the one or more media objects associated with data for providing an appearance of depth within the one or more media objects

530 based on the context, determine a viewing state for viewing a media object of the one or more media objects within the 3D environment, the viewing state defining whether the media object will be presented as a planar object or with depth within the 3D environment

540 in accordance with a determination that the viewing state is a first viewing state, present the media object within the 3D environment using its associated data for providing an appearance of depth

*FIGURE 5*

CONTEXT-BASED OBJECT VIEWING WITHIN 3D ENVIRONMENTS

CROSS-REFERENCE TO RELATED APPLICATIONS

This application is a continuation of International Application No. PCT/US2022/019411 filed Mar. 9, 2022, which claims the benefit of U.S. Provisional Application No. 63/162,597 filed Mar. 18, 2021, entitled "CONTEXT-BASED OBJECT VIEWING WITHIN 3D ENVIRON-MENTS," each of which is incorporated herein by reference in its entirety.

TECHNICAL FIELD

The present disclosure generally relates to electronic devices that render extended reality (XR) content and, in particular, to systems, methods, and devices in which XR content is presented in a three-dimensional (3D) environment based on context by an electronic device within a physical environment.

BACKGROUND

When an electronic device displays multiple instances of 3D XR content registered to a physical environment in a 3D environment, display of the 3D environment becomes cluttered and distracting. Accordingly, techniques for prioritizing, arranging, and/or simplifying the presentation of multiple instances of 3D XR content in a 3D environment are needed.

SUMMARY

Various implementations disclosed herein include devices, systems, and methods that present views of one or more media objects in a 3D environment using different viewing states (e.g., as a planar object or with depth) determined based on context. In some implementations, media objects are provided within a view of a 3D environment. The view may show depth for other objects (e.g., the background setting or physical environment). The media objects, in contrast, can show depth based on different sensor data from the media object capture environments (e.g., stereo image pairs, depth maps, parallax, etc.). In some implementations, the media objects are provided using different viewing states by selectively using the media objects' sensor data. In some implementations, whether and/or how the media objects exhibit depth is determined based on context. For one example, only the media object that the user is gazing at is displayed in stereo, while remaining media objects are displayed in 2D. In another example, only media objects that are within a particular distance range and/or viewing angle are displayed with stereo or parallax. In yet another example, a single media object is displayed in stereo and other media objects are displayed with parallax. In some implementations, the selective use of depth provides a more comfortable user experience by reducing or avoiding a cluttered environment where many media objects provide inconsistent depth experiences. In some implementations, the user experience may be further improved by providing transition effects as the media objects change viewing state.

In general, one innovative aspect of the subject matter described in this specification can be embodied in methods that include the actions of presenting a view of a 3D environment, and determining a context associated with viewing one or more media objects within the 3D environment, where the one or more media objects is associated with data for providing an appearance of depth within the one or more media objects. Based on the context, a viewing state is determined for viewing a media object of the one or more media objects within the 3D environment, the viewing state defining whether the media object will be presented as a planar object or with depth within the media object. Then, in accordance with a determination that the viewing state is a first viewing state, presenting the media object within the 3D environment using its associated data for providing an appearance of depth.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 is a flowchart illustrating an exemplary method of presenting views of one or more media objects in a 3D environment using different viewing states determined based on context in accordance with some implementations.

Figure 1:
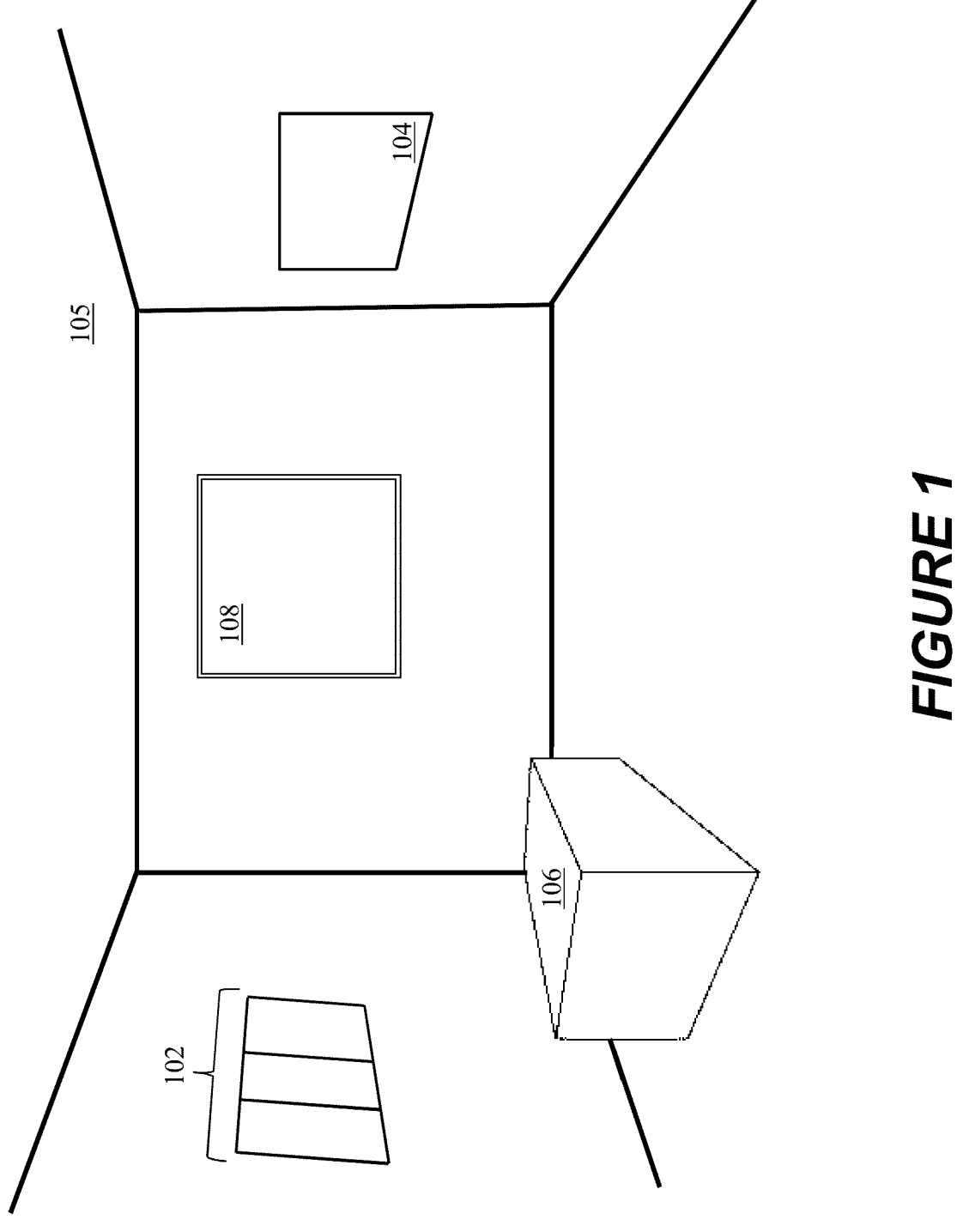
FIG. 1 illustrates a 3D environment in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Various implementations disclosed herein include devices, systems, and methods that present XR content in a 3D environment based on context by an electronic device within a physical environment. Stereoscopic 3D imaging by the electronic device presents two offset two-dimensional (2D) images separately to the left and right eye of the viewer. The pair of offset 2D left eye and right eye images are then combined in the brain of the viewer to give the perception of 3D depth. Stereoscopic techniques are distinguished from 3D displays that display an image in three full dimensions.

In some implementations, XR content such as a media object (e.g., virtual object, icon, widget, logo, animations, 3D photo, 3D video, executable apps, etc.) is a 3D media object. In some implementations, the display of one or more 3D media objects is transitioned from a first viewing state (e.g., 2D/planar) to a second viewing state (e.g., 3D/stereoscopic) in a 3D environment based on where a media object is positioned (e.g., center, close to a user, etc.), the media object's size, gaze tracking, interaction by the electronic device/user, orientation of the electronic device/user, or combinations thereof. In some implementations, one or more 3D media objects is transitioned from a planar display state to a stereoscopic display state using left eye and right eye pairs of stereoscopic images by creating intermediate images. In some implementations, a subset of the media objects is selected to be presented in stereoscopic 3D while remaining ones are displayed in 2D. In some implementations, the subset of media objects selected to be presented in stereoscopic 3D is based on context. In some implementations, a single one of the one or more of media objects is presented in stereoscopic 3D. In some implementations, the single one of the media objects that is presented in stereoscopic 3D is further isolated from remaining media objects.

FIG. 1 illustrates a 3D environment in accordance with some implementations. As shown in FIG. 1, the 3D environment includes a physical environment 105 including a first painting 102, a second painting 104, a desk 106, and a window 108. In some implementations, FIG. 1 illustrates a display of an electronic device showing the physical environment 105.

Figure 2:
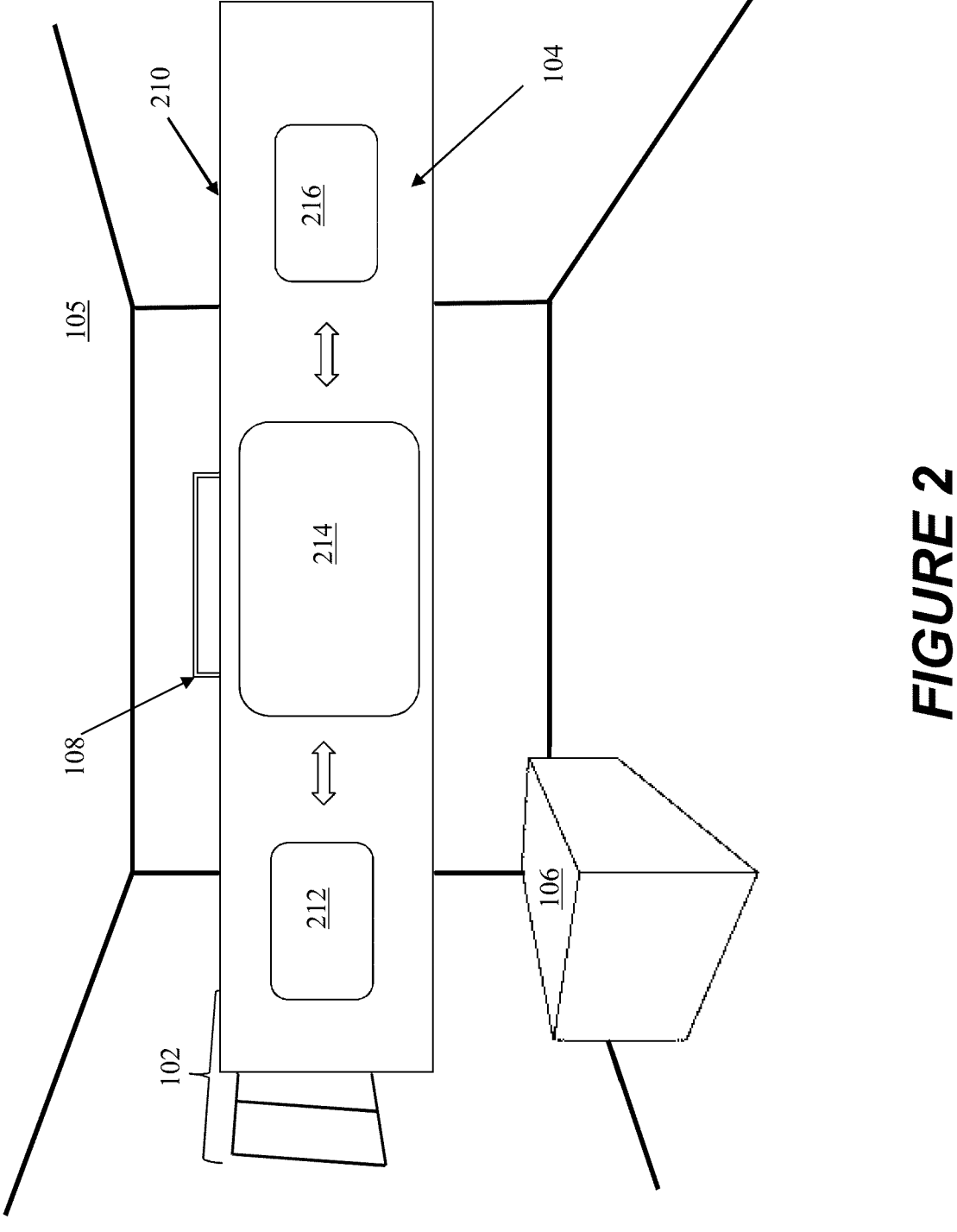
FIGS. 2-4 illustrate a 3D environment including XR content in accordance with some implementations.

FIG. 2 illustrates a 3D environment including XR content in accordance with some implementations. In some implementations, FIG. 2 illustrates a display of an electronic device including a physical environment 105 along with XR content in accordance with some implementations. In some implementations, XR content includes one or more 3D media objects positioned (e.g., pose and orientation) within the physical environment 105 (e.g., using a vision-based 3D environment such as SLAM to represent the physical environment 105). Alternatively, other 3D localization or positioning techniques are used to represent the physical environment 105 and used to position the XR content in the physical environment 105. In other implementations, the XR content is positioned with respect to a user of the electronic device or a display of the electronic device. In FIG. 2, a viewing window 210 for viewing media objects is positioned in the physical environment 105.

As shown in FIG. 2, the viewing window 210 is for scrolling through a plurality of 3D photos. In FIG. 2, the plurality of 3D photos includes 3D photos 212, 214, 216. In some implementations, as the user is scrolling through 3D photos using the viewing window 210 only the 3D photo 214 is shown with depth using stereoscopic imaging. In contrast, 3D photos 212, 216 are shown without depth or using monoscopic imaging. In some alternative implementations, only the one 3D photograph at which the user is looking (e.g., known through gaze tracking) is presented with depth using stereoscopic imaging while all remaining 3D photographs are presented as 2D or planar objects. It should be appreciated that while 3D photos 212 and 216 are presented as 2D or planar objects, they may still be treated and presented as an object having a 3D pose (e.g., position and orientation) within the 3D environment of the room. Only the content of the 3D photos 212 and 216 may be presented in a 2D manner.

In some implementations, the user can glance or switch their gaze between the plurality of 3D photographs 212, 214, 216 quickly without stopping on a single one. In this case, all the 3D photos 212, 214, 216 may be displayed as 2D objects without depth. In some implementations, gaze tracking uses a time interval (e.g., a threshold amount of time) so that only when the user's gaze stops and fixes on a single one of the 3D photos 212, 214, 216 is that single photo selected and transitioned to 3D viewing using stereoscopic imaging. In some implementations, the transition of the selected photo from a 2D object to the 3D photo using stereoscopic imaging occurs over a preset time interval.

In some implementations, the transition from a 3D presentation of a media object using stereoscopic imaging to a 2D or monoscopic presentation is performed by cross fading what one eye sees of the media object to match the other eye (e.g., change what the right eye sees to match what the left eye sees or vice versa). For example, the cross fade technique changes the portion of the right eye images (e.g., 2D images) that correspond to a media object in a series of steps over time until the portion of the right eye image that correspond to a media object matches the portion of the left eye image that correspond to a media object. Alternatively, the cross fade technique changes the portion of the left eye images (e.g., 2D images) that correspond to a media object in a series of steps over a plurality of frames until the portion of the left eye image that correspond to a media object matches the portion of the right eye image that correspond to a media object. The cross fade technique may occur fast enough so that the user does not see distortion and just sees the change to a monoscopic presentation (e.g., without depth). The cross fade technique may also be used (e.g., in reverse) to transition from a monoscopic presentation to the 3D presentation using stereoscopic imaging.

In other implementations, the transition from a 3D presentation using stereoscopic imaging to a 2D or monoscopic presentation is performed using re-projection techniques. In these implementations, additional visual indicators are generated to emphasize the transition from 2D presentation to stereoscopic presentation or vice versa. In these implementations, the re-projection techniques create additional properly projected 2D image pairs for the left eye and the right eye, respectively, for each frame presented during the transition. In one implementation, the re-projection techniques create additional properly projected 2D images for only one eye (e.g., just the left eye or just the right eye) for each frame presented during the transition. In this way, because the end point of the transition is known, the re-projection technique may add additional visual information (e.g., frames) to highlight the transition during the transition. The re-projection techniques may occur fast enough so that the user does not see distortion, but just the change in presentation.

In alternative implementations, the transition from a 3D presentation using stereoscopic imaging to a 2D or monoscopic presentation or vice versa is performed using Inter-Pupil Distance (IPD) transition techniques. In these implementations, the IPD of the user is known (e.g., gaze tracking) and the IPD transition techniques change from the user's IPD (e.g., 3D presentation using stereoscopic imaging) to an IPD of 0 (e.g., 2D or monoscopic presentation).

In one implementation, the IPD transition technique is represented by two virtual image sensors or cameras at the same position that is defined as IPD=0, and the two virtual image sensors being separated by a distance equal to the user's IPD (e.g., average human IPD is 64 mm) is defined as IPD=1. In this implementation, the transition from a 3D presentation using stereoscopic imaging to the monoscopic presentation accomplishes the transition from IPD=1 to IPD=0 over a preset number of frames or a preset time. The IPD transition techniques may occur fast enough so that the user does not see distortion, but just the change in presentation. In some implementations, other transition techniques are used to switch from the 3D presentation using depth to a 2D or planar presentation without depth or vice versa.

Figure 3:
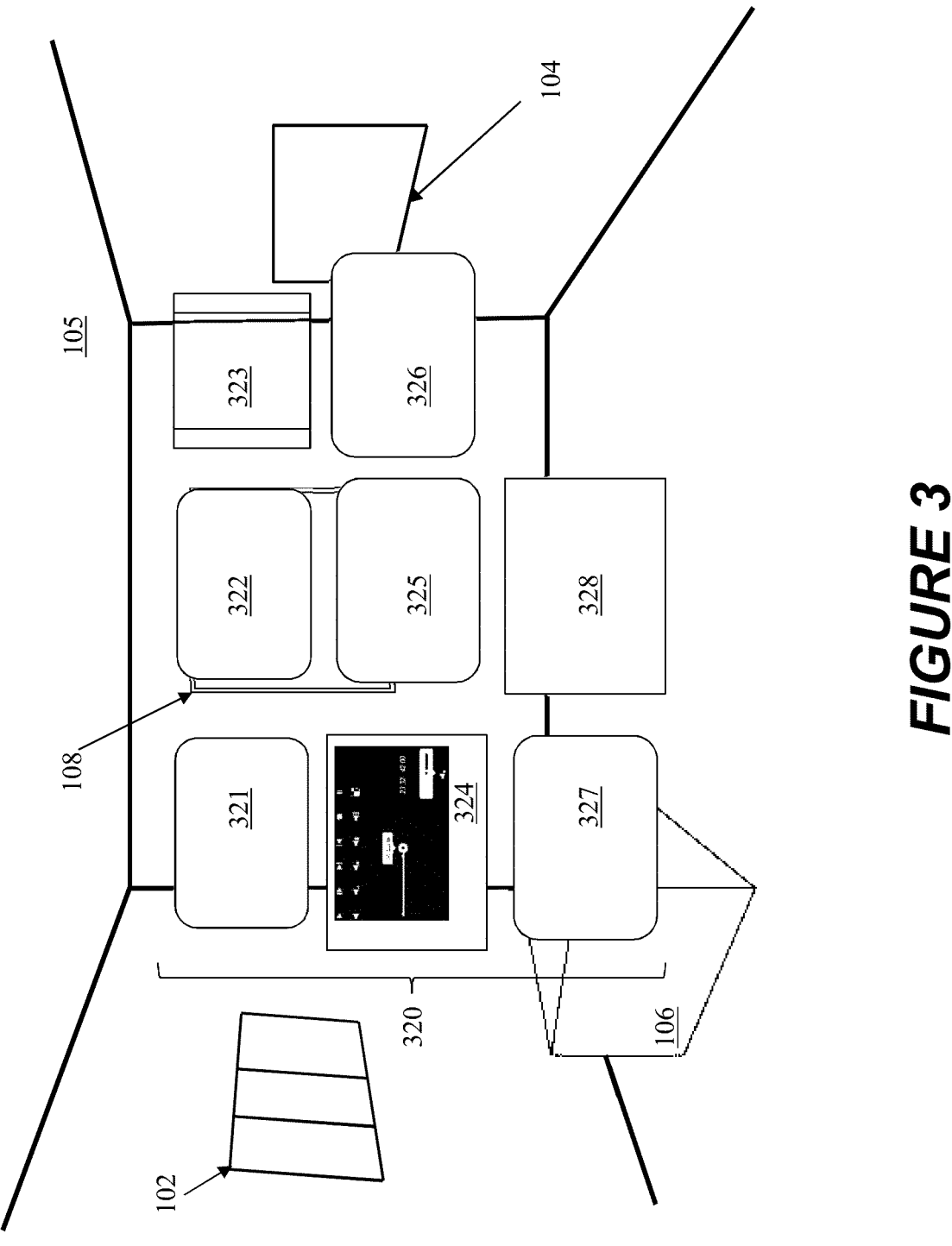
Figure 4:
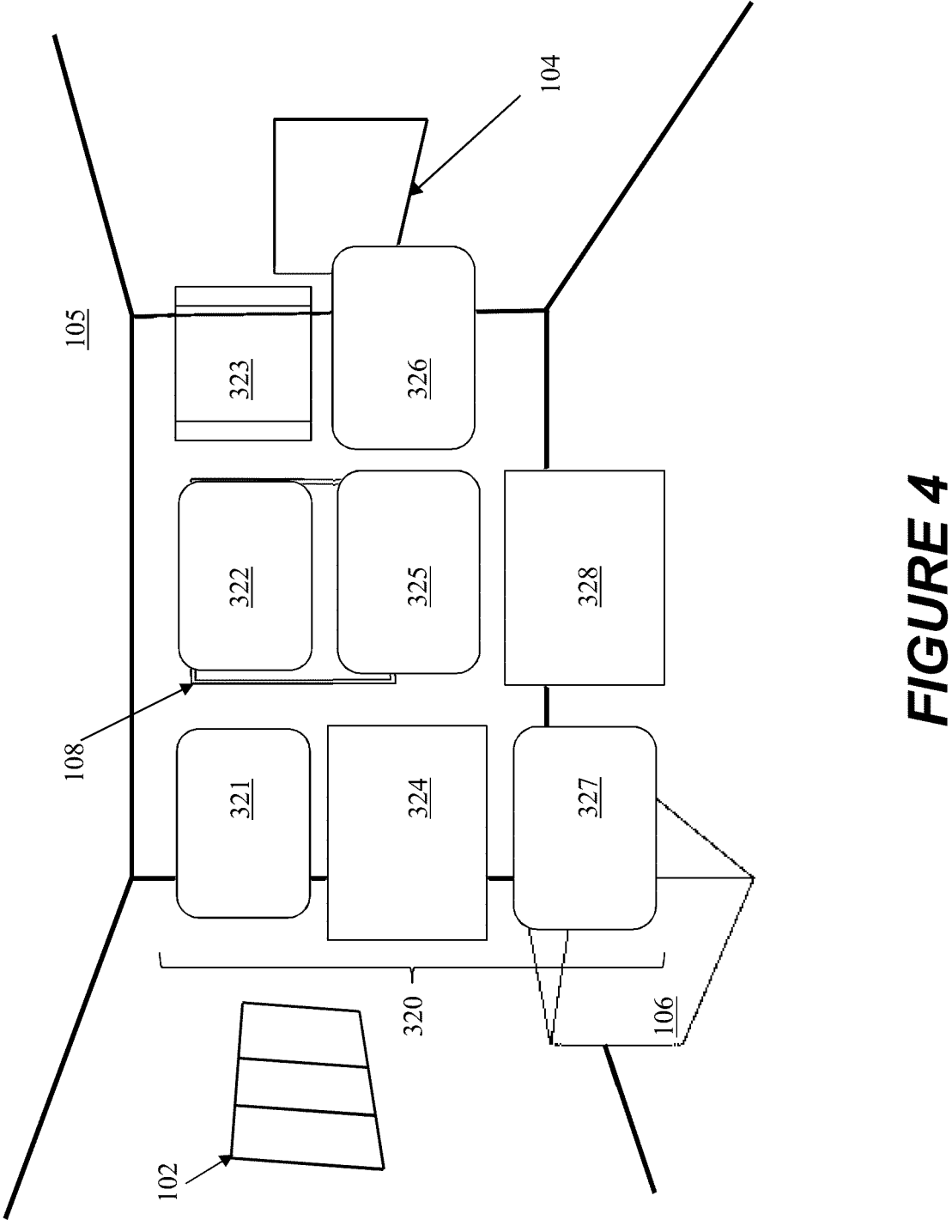

FIGS. 3-4 illustrate a 3D environment including XR content in accordance with some implementations. In FIG. 3, a plurality of media objects 320 including media objects 321, 322, 323, 324, 325, 326, 327, and 328 are presented in the physical environment 105. In some implementations, each of the media objects 321-328 uses the same 3D presentation mode. In some implementations, each of the media objects 321-328 include a 3D presentation mode different from the physical environment 105 and different from the other media objects 321-328. In some implementations, each of the 3D media objects transitions between at least a 3D presentation mode and a 2D presentation mode without depth information.

In some implementations, a 3D media object includes or has associated depth data (e.g., a depth map), and the associated depth data is used to create its 3D presentation mode. In one implementation, the depth data associated with a media object is used to create 3D effects as a viewpoint of the media object moves (e.g., a user moves left to right or moves up or down) in the 3D environment. In one implementation, the depth data associated with the media object determines at least a foreground and a background for the media object, and selective different movements of the foreground and background are used to present a 3D parallax presentation mode. In this case, the depth information is removed to generate a planar or 2D presentation mode (e.g., presented without its associated depth data) for the media object.

In some implementations, a 3D presentation mode for a media object uses depth based on a 3D view into a portal or into a different 3D environment. In this case, the 2D presentation mode may use a flattened image of the portal or a flattened image of the different 3D environment.

As shown in FIG. 3, activity of the electronic device (e.g., a user selecting a 3D video) transitioned the media object 324 to the stereoscopic 3D presentation mode and the remaining media objects 321-323, and 325-328 are transitioned to a 2D presentation mode. Alternatively, the remaining media objects 321-323, and 325-328 may be displayed using parallax techniques.

As shown in FIG. 4, the selected media objects 322-323 (e.g., that are within a particular distance range and/or viewing angle) are displayed with the stereoscopic 3D presentation mode and the remaining media objects 321, and 324-328 have been transitioned to a 2D presentation mode. Thus, in some implementations, a subset of the media objects are displayed using a first imaging technique and a subset of the remaining media objects are displayed using a second imaging technique.

In some implementations, actions other than gaze tracking may be used to select one or more media objects among a plurality of 3D media objects to use the stereoscopic 3D presentation mode. For example, a spatial or angular distance between the electronic device and the media objects may be used to select one or more of the media objects for stereo 3D presentation mode.

In some implementations, the media object is only presented as a 3D presentation mode when the electronic device is in a corresponding 3D viewing location (e.g., in the 3D environment). The size (e.g., width, length, height, radius, etc.) of the corresponding 3D viewing area varies with the amount or type of depth data associated with the media object. In some implementations, the presentation mode of the media object is automatically transitioned to planar when the electronic device transitions out of the 3D viewing location. In some implementations, the corresponding 3D viewing location is based on an orientation of a user of the electronic device.

In some implementations, a first media object is displayed using its 3D presentation mode, but the first media object is transitioned to its planar presentation mode when additional XR content (e.g., menu, icon, media object, etc.) overlays the first media content. Preventing or reducing overlying multiple or different 3D XR content may reduce exposing a user of the electronic device to 3D viewing inconsistencies.

In some implementations, the media object may include spatialized audio (e.g., surround sound or audio associated with immersive experiences). In some implementations, a 3D presentation mode may include spatialized audio or more complex audio and a corresponding planer presentation mode may include less granular audio such as a point source audio or stereo sound from a single direction.

In some implementations, at least some content of the media object is hidden or visually obscured during transitions between presentation modes. For example, a fog or other visual effect could cover at least a portion of the media object as the media object transitions to a 3D presentation mode. Using such techniques, abrupt or distracting transitions to a 3D representation can be reduced or have their effect minimized on a user of the electronic device.

Various implementations disclosed herein include devices, systems, and methods that present views of one or more media objects in a 3D environment using different viewing states determined based on context. In some implementations, media objects are provided within a view of a 3D environment. The view may show depth for other objects (e.g., the background setting or physical environment). The media objects, in contrast, can show depth based on different sensor data from the media object capture environments (e.g., stereo image pairs, depth maps, parallax, etc.).

In some implementations, the media objects are provided using different viewing states (e.g., presented as a planar object or with depth within the 3D environment) by selectively using the media objects' sensor data. In some implementations, whether and/or how the media objects exhibit depth is determined based on context. For one example, only the media object that the user is gazing at is displayed in stereo, while remaining media objects are displayed in 2D. In another example, only media objects that are within a particular distance range and/or viewing angle are displayed stereoscopically or using parallax. In yet another example, a single media object is displayed stereoscopically and other media objects are displayed with parallax. The selective use of depth (e.g., based on media object sensor information) provides a more comfortable user experience by reducing or avoiding a cluttered environment where many media objects provide inconsistent depth experiences. In some implementations, the user experience may be further improved by providing transition effects as the media objects change viewing state (e.g., between a planar object or presented with depth within the 3D environment).

FIG. 5 is a flowchart illustrating an exemplary method of presenting views of one or more media objects in a 3D environment using different viewing states (e.g., as a planar object or with depth) determined based on context. In some implementations, the method 500 is performed by a device (e.g., electronic device 620, 700 of FIGS. 6 and 7). The method 500 can be performed using an electronic device or by multiple devices in communication with one another. In some implementations, the method 500 is performed by processing logic, including hardware, firmware, software, or a combination thereof. In some implementations, the method 500 is performed by a processor executing code stored in a non-transitory computer-readable medium (e.g., a memory). In some implementations, the method 500 is performed by an electronic device having a processor.

At block 510, the method 500 presents a view of a 3D environment. In some implementations, the view of the 3D environment includes an optical-see through view or a video pass-through view of a surrounding physical environment. For example, the view depicts depth of objects of the 3D environment using first data corresponding to the 3D positions of the physical objects within the 3D environment. Alternatively, the 3D environment includes stereo images providing a view of an immersive virtual 3D environment from a viewpoint.

At block 520, the method 500 determines a context associated with viewing one or more media objects within the 3D environment, the one or more media objects associated with data for providing an appearance of depth within the one or more media objects. In some implementations, each media object is a stereoscopic image pair or associated with a depth data (e.g., a depth map used to generate 3D effects like parallax effects). In some implementations, the context is determined by whether a gaze direction is directed towards one of the one or more media objects within the 3D environment. Alternatively, the context is determined by whether there is an interaction with (e.g., scrolling) one of the one or more media objects within the 3D environment. In other implementations, the context is determined by whether an orientation is directed to within a threshold distance or threshold angle of one of the one or more media objects in the 3D environment. Further, the context may be determined by whether an additional XR content (e.g., user interface component) overlays one of the one or more media objects in the view of the 3D environment.

At block 530, based on the context, the method 500 determines a viewing state for viewing a media object of the one or more media objects within the 3D environment, the viewing state defining whether the media object will be presented as a planar object or with depth within the media object.

In one example, viewing states for a media object include (a1) 2D based on using single image of a stereoscopic pair of a left eye image and a right eye images, and (a2) stereoscopic depth based on using stereoscopic pairs of left eye images and right eye images. In another example, viewing states for a media object include (b1) 2D based on using an image without using its associated depth data, and (b2) 3D effects with depth based on using an image and its associated depth data, for example, to provide parallax depth effects. In yet another example, viewing states for a media object include (c1) flat based on a flattened image of a portal or other 3D environment view, and (c2) with depth based on a 3D view into a portal or other 3D environment view.

At block 540, in accordance with a determination that the viewing state is a first viewing state, the method 500 presents the media object within the 3D environment using its associated data for providing the appearance of depth. In some implementations, the first viewing state is a stereo viewing state in which a left eye view and a right eye view receive a stereoscopic pair of viewing locations within the 3D environment generated using image-pairs captured at different locations within a capturing environment. This stereo viewing state of the media object is presented for different viewing positions of the media object in the 3D environment. In some implementations, the first viewing state is a stereo viewing state in which a left eye view and a right eye view provide different views of the media object by separating a foreground portion and a background portion of the media object using depth data associated with the media object, and adjusting the foreground portion and the background portion to provide the different parallax depth views for the left eye view and the right eye view. In some implementations, the associated data for providing an appearance of depth is a 3D geometry of content of the media object. In some implementations, the depth data associated with the media object is from a depth sensor, stereo pair of sensors determining depth estimation, obtained using computer vision techniques (e.g., SLAM, VIO, etc.), or the like. In some implementations, the media object is a 3D photograph, a 3D video, or a 3D image of virtual environment.

In some implementations, in accordance with a determination that the viewing state is a second viewing state, the method 500 presents the media object within the 3D environment without using its associated data for providing the appearance of depth. For example, the second viewing state is a monoscopic viewing state in which a left eye view and a right eye view receive an identical view of the media object. In another example, the second viewing state is a 2D viewing state in which a left eye view and a right eye view are used to form a 2D view of the media object.

In some implementations based on the context, the method 500 determines a first viewing state for viewing a first media object of the one or more media objects and presents the first media object using its associated data for providing an appearance of depth within the 3D environment. Then, in accordance with a determination that a viewing state for viewing a second media object of the one or more media objects within the 3D environment is a second viewing state different than the first viewing state, presents, concurrently with the first media object, the second media object within the 3D environment without using its associated data for providing an appearance of depth.

In some implementations, the method 500 determines an updated context associated with viewing the one or more media objects within the 3D environment. Based on the updated context, an updated viewing state is determined for viewing the media object within the 3D environment. Further, in accordance with a determination that the viewing state is the first viewing state and the updated viewing state is a second viewing state, the presentation of the media object is transitioned from presenting the media object using its associated data for providing an appearance of depth to presenting the media object without using its associated data for providing an appearance of depth over a time period. In some implementations, at least some content of the media object is hidden or obscured during the transition. In some implementations, the transitioning is based on the associated data for providing an appearance of depth In some implementations, blocks 510-540 are repeatedly performed. In some implementations, the techniques disclosed herein may be implemented on a wearable device that provides an optical-see through view or a video pass-through view of a surrounding physical environment.

Figure 6:
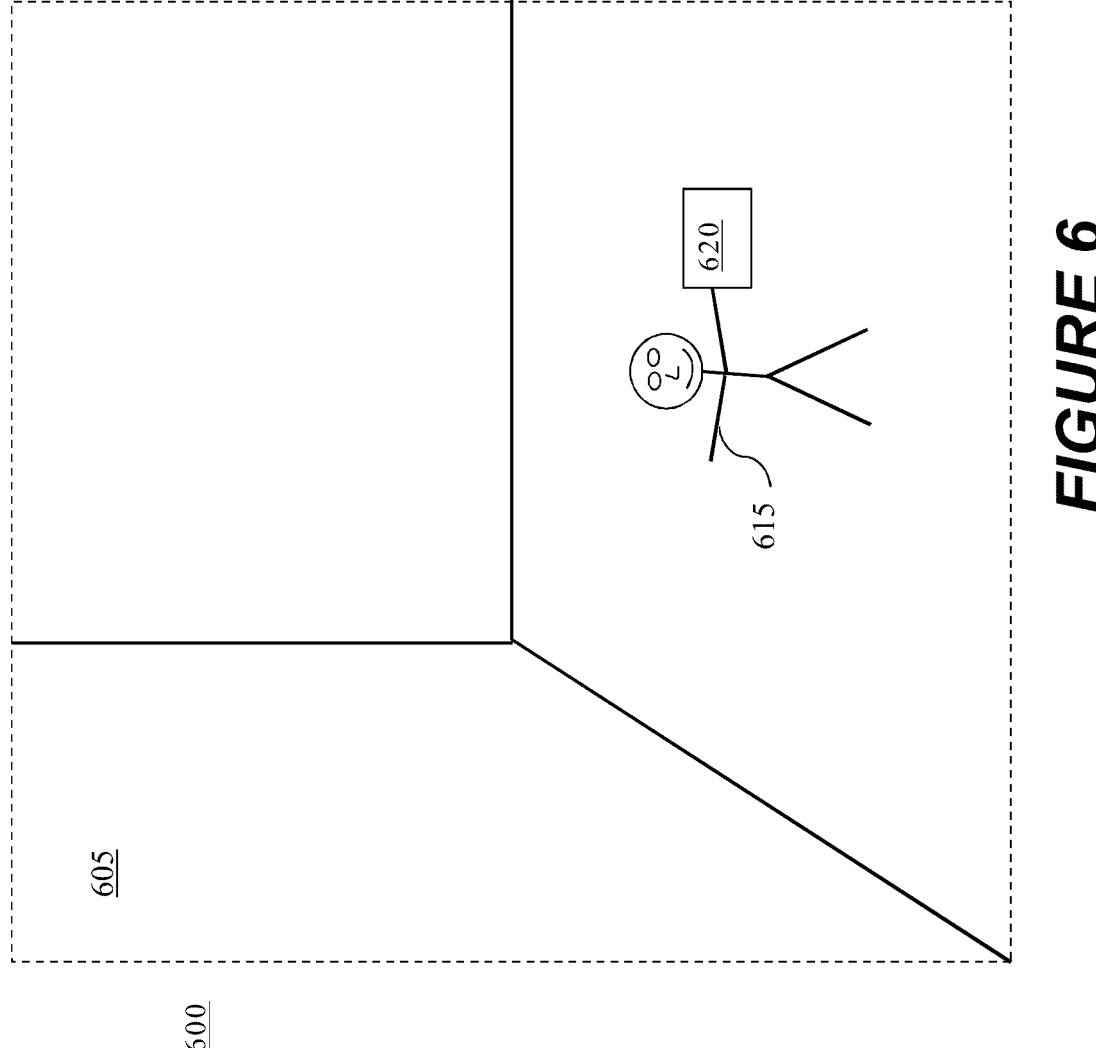
FIG. 6 illustrates an example operating environment in accordance with some implementations.

FIG. 6 illustrates an example operating environment 600 in which electronic device 620 is used in physical environment 605. People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

In the example of FIG. 6, the device 620 is illustrated as a single device. Some implementations of the device 620 are hand-held. For example, the device 620 may be a mobile phone, a tablet, a laptop, and so forth. In some implementations, the device 620 is worn by a user 615. For example, the device 620 may be a watch, a head-mounted device (HMD), and so forth. In some implementations, functions of the device 620 are accomplished via two or more devices, for example additionally including an optional base station. Other examples include a laptop, desktop, server, or other such device that includes additional capabilities in terms of power, CPU capabilities, GPU capabilities, storage capabilities, memory capabilities, and the like. The multiple devices that may be used to accomplish the functions of the device 620 may communicate with one another via wired or wireless communications.

Figure 7:
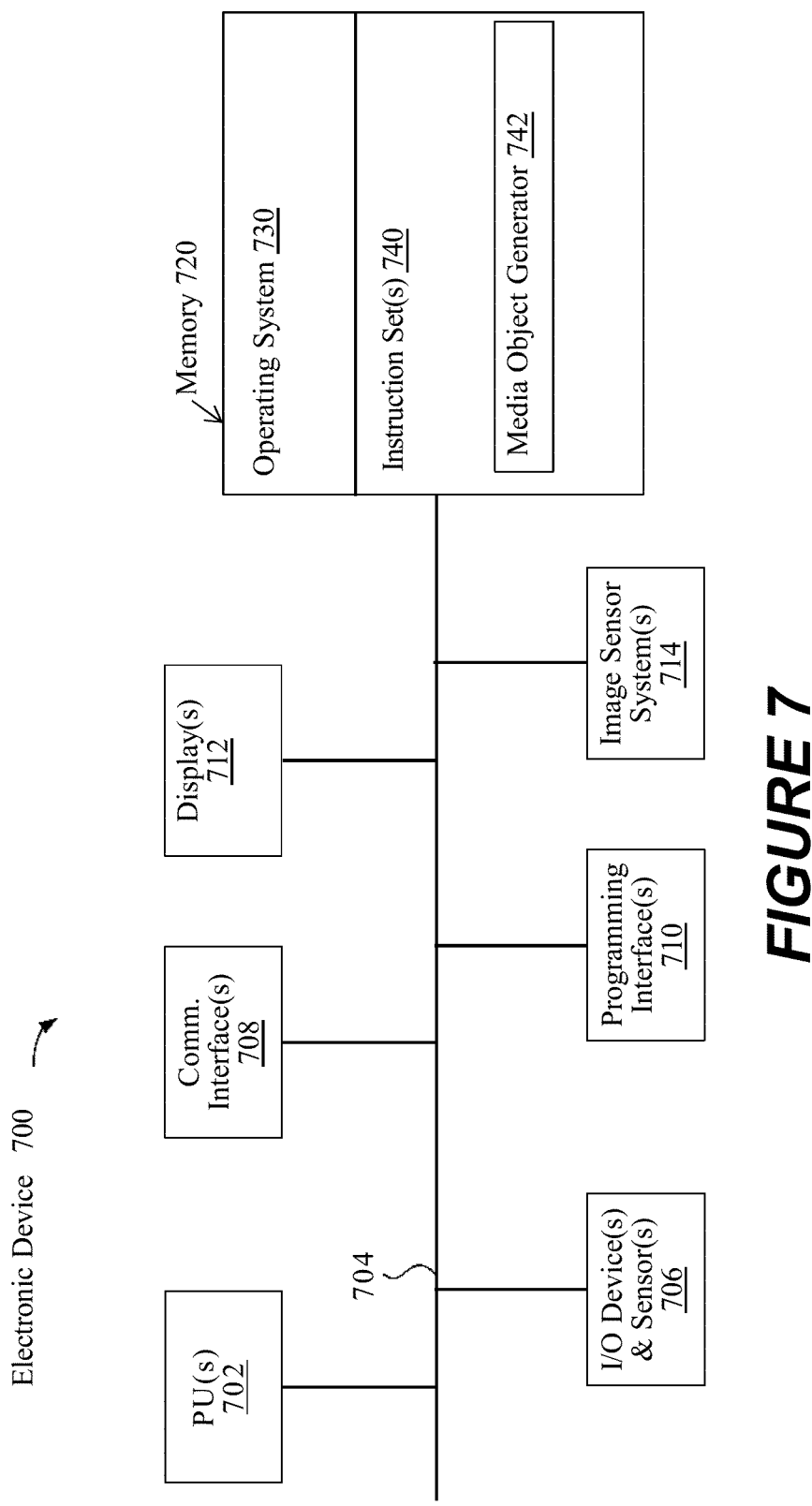
FIG. 7 illustrates an example electronic device in accordance with some implementations.

FIG. 7 is a block diagram of an example device 700. Device 700 illustrates an exemplary device configuration for the device 620. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 700 includes one or more processing units 702 (e.g., microprocessors, ASICs, FPGAs, GPUs, CPUs, processing cores, or the like), one or more input/output (I/O) devices and sensors 706, one or more communication interfaces 708 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, I2C, or the like type interface), one or more programming (e.g., I/O) interfaces 710, one or more displays 712, one or more interior or exterior facing sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 712 are configured to present content to the user. In some implementations, the one or more displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 712 correspond to diffractive, reflective, polarized, holographic, etc. waveguide displays. For example, the electronic device 700 may include a single display. In another example, the electronic device 700 includes a display for each eye of the user.

In some implementations, the one or more interior or exterior facing sensor systems 714 include an image capture device or array that captures image data or an audio capture device or array (e.g., microphone) that captures audio data. The one or more image sensor systems 714 may include one or more RGB cameras (e.g., with a complimentary metal-oxide-semiconductor (CMOS) image sensor or a charge-coupled device (CCD) image sensor), monochrome cameras, IR cameras, or the like. In various implementations, the one or more image sensor systems 714 further include an illumination source that emits light such as a flash. In some implementations, the one or more image sensor systems 714 further include an on-camera image signal processor (ISP) configured to execute a plurality of processing operations on the image data.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium.

In some implementations, the memory 720 or the non-transitory computer readable storage medium of the memory 720 stores an optional operating system 730 and one or more instruction set(s) 740. The operating system 730 includes procedures for handling various basic system services and for performing hardware dependent tasks. In some implementations, the instruction set(s) 740 include executable software defined by binary information stored in the form of electrical charge. In some implementations, the instruction set(s) 740 are software that is executable by the one or more processing units 702 to carry out one or more of the techniques described herein.

In some implementations, the instruction set(s) 740 include an media object generator 742 that is executable by the processing unit(s) 702 to present views of one or more media objects in a 3D environment using different viewing states (e.g., as a planar object or with depth) determined based on context according to one or more of the techniques disclosed herein.

Although the instruction set(s) 740 are shown as residing on a single device, it should be understood that in other implementations, any combination of the elements may be located in separate computing devices. FIG. 7 is intended more as a functional description of the various features which are present in a particular implementation as opposed to a structural schematic of the implementations described herein. As recognized by those of ordinary skill in the art, items shown separately could be combined and some items could be separated. For example, actual number of instruction sets and the division of particular functions and how features are allocated among them will vary from one implementation to another and, in some implementations, depends in part on the particular combination of hardware, software, or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a processor:

presenting a view of a three-dimensional (3D) environment;

determining a context associated with viewing one or more media objects positioned within the 3D environment, the one or more media objects associated with data for providing an appearance of depth within the one or more media objects, the media object comprising content depicting a media capture environment in which the media object was captured, and the data for providing the appearance of depth corresponding to depths of corresponding elements of the media capture environment, and wherein determining the context comprises determining whether the media object is positioned within a viewing angle threshold in the view of the 3D environment;

based on the context, determining a viewing state for viewing a media object of the one or more media objects within the 3D environment, the viewing state defining whether the media object will be presented within the 3D environment as a planar object or with depth based on depths of corresponding elements of the media capture environment; and in accordance with a determination that the viewing state is a first viewing state, presenting the view of the 3D environment showing depth for objects of a background setting or physical environment and the media object positioned within the 3D environment, wherein the media object is provided using its associated data for providing an appearance of depth based on depths of corresponding elements of the media capture environment.

2. The method of claim 1, the method further comprising in accordance with a determination that the viewing state is a second viewing state, presenting the media object within the 3D environment without using its associated data for providing an appearance of depth.

3. The method of claim 1, wherein the second viewing state comprises a monoscopic viewing state in which a left eye view and a right eye view receive a pair of the same view of the media object.

4. The method of claim 1, wherein the first viewing state comprises a stereo viewing state in which a left eye view and a right eye view receive a stereoscopic pair of viewing locations within the 3D environment generated using image-pairs captured at different locations within a capturing environment.

5. The method of claim 4, wherein the stereo viewing state of the media object is presented for different viewing positions of the media object in the 3D environment.

6. The method of claim 1, wherein the first viewing state comprises a stereo viewing state in which a left eye view and a right eye view provide different views of the media object by:

separating a foreground portion and a background portion of the media object using the associated data for providing an appearance of depth, wherein the associated data for providing an appearance of depth comprises depth data associated with the media object; and adjusting the foreground portion and the background portion to provide the different views for the left eye view and the right eye view.

7. The method of claim 1, wherein the associated data for providing an appearance of depth is obtained from a depth sensor.

8. The method of claim 1, wherein the associated data for providing an appearance of depth is obtained from stereo pair depth estimation.

9. The method of claim 1, wherein the associated data for providing an appearance of depth is obtained from computer vision techniques.

10. The method of claim 1, wherein the view depicts depth of objects of the 3D environment using first data corresponding to the 3D positions of the objects within the 3D environment.

11. The method of claim 1, further comprising:

based on the context, determining a viewing state for viewing a second media object of the one or more media objects within the 3D environment; and in accordance with a determination that the viewing state for viewing the second media object is a second viewing state different than the first viewing state, presenting, concurrently with the media object, the second media object within the 3D environment without using its associated data for providing an appearance of depth.

12. The method of claim 1, wherein determining the context comprises determining whether a gaze direction is directed towards one of the one or more media objects within the 3D environment.

13. The method of claim 1, wherein determining the context comprises determining whether there is an interaction with one of the one or more media objects within the 3D environment.

14. The method of claim 1, wherein determining the context comprises determining whether an orientation is directed to within a distance of one of the one or more media objects in the 3D environment.

15. The method of claim 1, wherein determining the context comprises determining whether a user interface component overlays one of the one or more media objects in the view of the 3D environment.

16. The method of claim 1, wherein the media object comprises a 3D photo.

17. The method of claim 1, wherein the media object comprises a 3D video.

18. The method of claim 1, wherein the media object comprises a 3D image of a virtual environment.

19. The method of claim 1, wherein:

the objects of the background setting or physical environment are shown with depth based on the background setting or physical environment; and the media object is provided with an appearance of depth based on different sensor data from a media object capture environment.

20. The method of claim 1, wherein determining the context comprises determining whether the media object is positioned within a particular distance range of the viewpoint within the 3D environment.

21. The method of claim 1, further comprising:

determining an updated context associated with viewing the one or more media objects within the 3D environment;

based on the updated context, determining an updated viewing state for viewing the media object within the 3D environment; and in accordance with a determination that the viewing state is the first viewing state and the updated viewing state is a second viewing state, transitioning the presentation of the media object from presenting the media object using its associated data for providing an appearance of depth to presenting the media object without using its associated data for providing an appearance of depth in a series of steps over a time period.

22. The method of claim 21, further comprising transitioning the viewing state from the first viewing state to a second viewing state by adjusting one eye's view of the media object to match the other eye's view of the media object over a time period.

23. The method of claim 21, wherein the transitioning comprises performing a reprojection for each of multiple frames of a transition using depth data or a 3D representation of the 3D environment.

24. The method of claim 21, wherein the transitioning is based on the associated data for providing an appearance of depth, wherein the associated data for providing an appearance of depth comprises a 3D geometry of content of the media object.

25. The method of claim 21, wherein at least some content of the media object is hidden or obscured during the transitioning.

26. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

presenting a view of a three-dimensional (3D) environment;

determining a context associated with viewing one or more media objects positioned within the 3D environment, the one or more media objects associated with data for providing an appearance of depth within the one or more media objects, the media object comprising content depicting a media capture environment in which the media object was captured, and the data for providing the appearance of depth corresponding to depths of corresponding elements of the media capture environment, and wherein determining the context comprises determining whether the media object is positioned within a viewing angle threshold in the view of the 3D environment;

based on the context, determining a viewing state for viewing a media object of the one or more media objects within the 3D environment, the viewing state defining whether the media object will be presented within the 3D environment as a planar object or with depth based on depths of corresponding elements of the media capture environment; and in accordance with a determination that the viewing state is a first viewing state, presenting the view of the 3D environment showing depth for objects of a background setting or physical environment and the media object positioned within the 3D environment, wherein the media object is provided using its associated data for providing an appearance of depth based on depths of corresponding elements of the media capture environment.

27. A non-transitory computer-readable storage medium, storing program instructions executable via one or more processors to perform operations comprising:

presenting a view of a three-dimensional (3D) environment;

determining a context associated with viewing one or more media objects positioned within the 3D environment, the one or more media objects associated with data for providing an appearance of depth within the one or more media objects, the media object comprising content depicting a media capture environment in which the media object was captured, and the data for providing the appearance of depth corresponding to depths of corresponding elements of the media capture environment, and wherein determining the context comprises determining whether the media object is positioned within a viewing angle threshold in the view of the 3D environment;

based on the context, determining a viewing state for viewing a media object of the one or more media objects within the 3D environment, the viewing state defining whether the media object will be presented within the 3D environment as a planar object or with depth based on depths of corresponding elements of the media capture environment; and in accordance with a determination that the viewing state is a first viewing state, presenting the view of the 3D environment showing depth for objects of a background setting or physical environment and the media object positioned within the 3D environment, wherein the media object is provided using its associated data for providing an appearance of depth based on depths of corresponding elements of the media capture environment.

* * * * *